United States Patent [19]

O'Neill

[11] Patent Number: 5,793,020
[45] Date of Patent: Aug. 11, 1998

[54] ELECTRICALLY HEATED WATER BOILING VESSELS

[75] Inventor: Robert Andrew O'Neill, Buxton, England

[73] Assignee: Otter Controls Limited, Derbyshire, England

[21] Appl. No.: 633,718

[22] PCT Filed: Oct. 21, 1994

[86] PCT No.: PCT/GB94/02323

§ 371 Date: Jun. 12, 1996

§ 102(e) Date: Jun. 12, 1996

[87] PCT Pub. No.: WO95/11515

PCT Pub. Date: Apr. 27, 1995

[30] Foreign Application Priority Data

Oct. 21, 1993 [GB] United Kingdom ............ 9321681
Jan. 27, 1994 [GB] United Kingdom ............ 9401559

[51] Int. Cl.[6] .............. F27D 11/02; A47J 31/56
[52] U.S. Cl. .............................. 219/441; 99/323.3
[58] Field of Search ........................ 219/385–387, 219/438, 439, 441, 442; 392/441, 444; 99/287, 323.3

[56] References Cited

U.S. PATENT DOCUMENTS

| 3,513,292 | 5/1970 | Sano et al. | 219/441 |
| 4,292,888 | 10/1981 | Wells et al. | 219/441 |
| 4,726,288 | 2/1988 | Lansing | 219/441 |
| 5,539,185 | 7/1996 | Polster | 219/439 |
| 5,635,092 | 6/1997 | O'Neill | 219/441 |

FOREIGN PATENT DOCUMENTS

| 1384527 | 2/1975 | United Kingdom. |
| WO93/18631 | 9/1993 | WIPO. |

Primary Examiner—Teresa J. Walberg
Assistant Examiner—J. Pelham
Attorney, Agent, or Firm—D. Peter Hochberg

[57] ABSTRACT

An electrically heated water boiling vessel has a planar heating element incorporated into the base of the vessel, the planar heating element comprising a stainless steel plate having a printed heating element formed on the underside thereof, the printed heated element being sandwiched between electrically-insulating layers of glass. A control for switching off the element in an overtemperature situation has a primary actuator in the form of a bimetal which directly accesses the printed heating element through a window formed in the outermost glass insulating layer, and the bimetal is held in a secondary actuator in the form of a thermally-collapsible carrier for the bimetal which contacts the glass insulation around the window; by this means the primary and secondary actuators are subjected to different temperatures. An enclosure is provided on the opposite (wet) side of the planar heating element at a location corresponding to the window location, the enclosure being apertured to admit water when the vessel is filled and serving to simulate an overtemperature situation sensible by the bimetal when water boils in the vessel and the steam generated in the enclosure expels the water therefrom; by this means a signal control can achieve automatic switching off upon boiling and also provide element overtemperature protection.

17 Claims, 2 Drawing Sheets

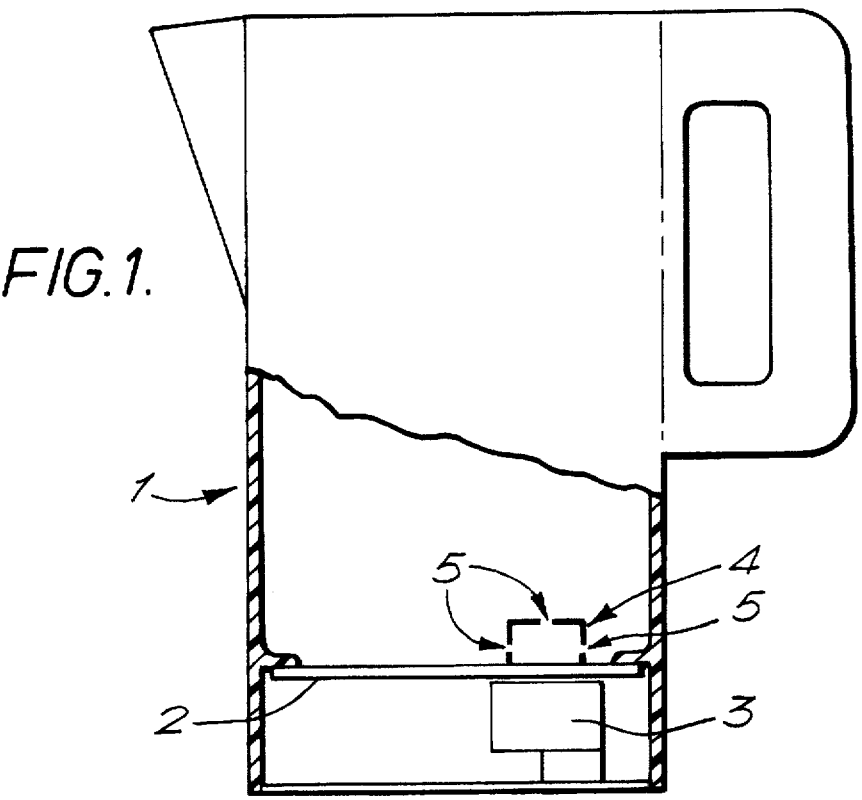
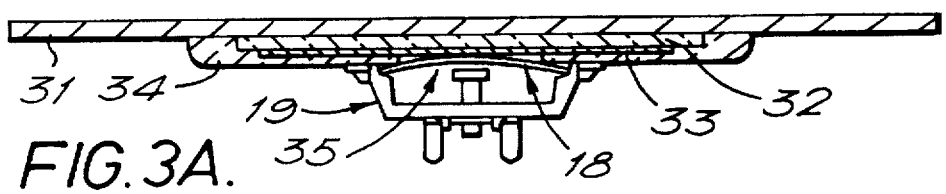
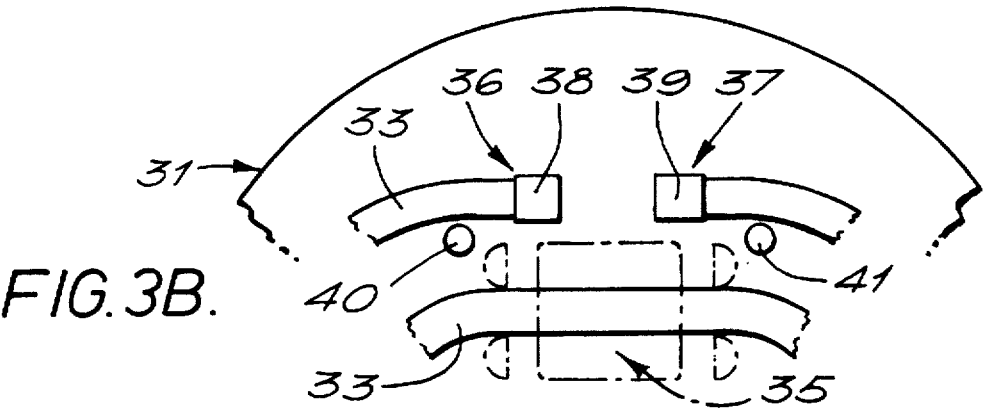

ELECTRICALLY HEATED WATER BOILING VESSELS

FIELD OF THE INVENTION

This invention concerns improvements relating to electrically heated water boiling vessels such as electric kettles and hot water jugs and also including pots, pans, urns, laboratory equipment etc., and further concerns improvements in electrical heating elements for such vessels and associated controls adapted to determine the operation of the heating element. Whilst the present invention has particular application to electric kettles and hot water jugs and will be described in the following with reference to such application, it is not limited to such an application.

BACKGROUND OF THE INVENTION

Automatic electric kettles and hot water jugs are conventionally provided with two thermal controls, namely an element protector control adapted to switch off the supply of power to the electric heating element of the appliance in a sensed overtemperature situation resulting from the appliance being switched on empty for example, and a steam control for reducing or switching off the supply of power to the heating element when the water being heated boils. Such controls generally have their own thermal sensors, commonly a bimetallic element, and the element protector control may further include some form of secondary or back-up protection arranged to operate in the event, however unlikely, of failure of the primary control. An exemplary element protector control is the X1 control manufactured by Otter Controls Ltd. and substantially as described in GB-A-2194099 with reference particularly to FIGS. 3A, 3B and 3C thereof, and an exemplary steam control is the J1 control manufactured by Otter Controls Ltd. and substantially as described in GB-A-2212664 with reference particularly to FIGS. 3A to 3M thereof.

A single sensor electronic control for a water boiling vessel is described in GB-A-2228634. This control utilizes a thermistor and senses element temperature as a function of the electrical resistance of the thermistor and the onset of boiling as a function of the rate of change of the thermistor resistance. However, even with the current state of modern electronics a circuit capable of switching a mains load cannot readily be manufactured at a price competitive with bimetallic controls.

A single sensor control is proposed in GB-A-1 143 834 (Matsushita) but has never been manufactured, so far as we are aware. According to this proposal, a sheathed, insulated, resistance heating element mounted to a head plate, providing for mounting of the element in a kettle or other water boiling vessel, has the heating element proper bent to define a hot return portion which is attached to the element head plate at a location above the general level of the major part of the heating element, and an apertured enclosure is provided on the element head plate in the region where the element hot return portion attaches thereto. The provision of a hot return element portion which attaches to the element head at a level above the major part of the heating element proper was conventional at the time of filing of GB-A-1 143 834, this arrangement ensuring that if a non-automatic kettle is accidentally left to boil dry the hot return part of the element will be exposed first as the water level drops and will consequently overheat thereby providing a thermal signal through the element head to a bimetallic or other control provided on the opposite side thereof. By this means the element can be switched off before any substantial part of the element seriously overheats. By enclosing the hot return part of the element within an enclosure provided with small openings sufficient to admit water to the interior of the enclosure when the kettle is cold, the proposal of GB-A-1 143 834 was that the steam generated within the enclosure on boiling would drive the water from the enclosure whereupon the hot return portion of the element would overheat and cause the bimetallic or other control to operate. In accordance with the arrangement proposed in GB-A-1 143 834, a single bimetallic or other control will operate both when a kettle boils and when a kettle is switched on dry.

As mentioned above, the proposal of GB-A-1 143 834 has not to our knowledge ever been manufactured despite its apparent simplicity and the promised advantage of a single sensor bimetallic control providing both element overtemperature protection and boil sensing. Furthermore, in tests that we conducted we found it impossible with a heating element as described in GB-A-1 143 834 to achieve a sufficient temperature rise on boiling to reliably operate a thermal actuator. Such an actuator, it is to be understood, has to be able to discriminate between the temperatures experienced during normal heating, which may be elevated by lime scale for example, and the temperature experienced when the water boils.

In our International Patent Application No. PCT/GB 93/00500 (WO 93/18631) there is described the combination of a stainless steel sheathed heating element having a hot return portion spot welded to a stainless steel head plate and with an enclosure provided around the hot return portion such as to cause the temperature of the hot return portion to rise significantly above 100° C. when in use of the element water is boiled in an associated vessel and steam generation within the enclosure expels water therefrom, and a thermally-responsive control adapted to switch off the supply of electric power to the element when the element head plate temperature reaches a predetermined level, the control being adapted and arranged to be responsive to the temperature of the element head plate substantially at the location of said spot weld. As is explained in WO 93/18631, by replacement of the brazed area conventionally used to couple the hot return portion of the heating element to the head plate by a highly localized spot weld, and by restricting application of heat sink compound between the bimetal blade of the thermally-responsive control and the rear of the element head to the small area of the spot weld, we were able to obtain satisfactory operation of the control in both element protector and boil sensing modes of operation and thus overcome the problems associated with GB-A-1143834.

In an alternative arrangement which is described in our International Patent Application No. PCT/GB 93/00501 (WO 93/18632) the ends (cold tails) of an elongate, metal-sheathed, electrically insulated, resistance heating element are engaged with an element head advantageously (though not essentially) formed of an appropriate heat-resistant synthetic plastics material, a heat transfer element formed of a high thermal conductivity material extends from a heated part of the element adjacent to one of its ends and through the element head to provide for sensing of the element temperature by means of an appropriate control, and an enclosure surrounds the said heated part of the element portion, the arrangement being such that in use of the heating element with a water boiling vessel the enclosure will fill with water when the vessel is filled and the onset of boiling and the consequent generation of steam in said enclosure will cause the water substantially to be expelled therefrom so as to mimic a dry boil situation sensible by an appropriate thermally-responsive control thermally coupled to said heat transfer element. As is explained in WO 93/18632, this arrangement also enables a single control to perform both element protection and boil detection functions.

SUMMARY OF THE INVENTION

The present invention provides yet a further arrangement which enables a single thermally-responsive control to provide both element protection and boil detection functions. According to the present invention, a planar heating element which, as described hereinafter, can take a variety of different forms is either clamped or otherwise coupled to or constitutes a wall, a bottom or base wall for example, of a water boiling vessel, a thermally-responsive control, such as the aforementioned X1 control for example or an adaptation thereof, is arranged in thermal contact with the heating element at a specific location thereof, and an enclosure is provided in the vessel at a location on the said wall thereof corresponding to the location of the thermal contact o: the control with the heating element, the arrangement of the enclosure being such that in use of the vessel the enclosure will fill with water when the vessel is filled and the onset of boiling and the consequent generation of steam in the enclosure will cause the water substantially to be expelled therefrom so as to mimic a dry boil situation sensible by the thermally-responsive control.

The invention also extends to the combination of a planar heating element as aforesaid, for coupling to or incorporation as a wall of a water boiling vessel, and an enclosure as aforesaid. The enclosure may be affixed to the heating element in the case that the heating element is adapted itself to form a wall of the liquid heating vessel, or may have formations adapted for engagement with complementary formations provided on the heating element for enabling the operative attachment of the enclosure to the heating element.

In operation of an arrangement in accordance with the present invention, the filling of the vessel with water will cause water to be admitted to the enclosure and, when the water is heated and eventually boils, the generation of steam within the enclosure will cause water to be expelled therefrom thereby giving rise to a simulated dry-boil condition in the enclosure which causes a local increase in the temperature of the heating element and trips the temperature sensitive control. The openings in the enclosure are designed so that local boiling within the enclosure, which can occur on account of the limitation by the enclosure of convection currents established within the volume of water being heated, will cause steam to be ejected and to be replaced by relatively cool water from the main part of the vessel, but when the water in the vessel boils as a whole there is no longer a supply of relatively cool water and the area of the element beneath the enclosure boils dry and its temperature rises significantly and rapidly so as to trip the control.

The aforementioned planar heating element may for example be in the form of an elongate, metal-sheathed, electrically insulated, resistance heating element affixed to a planar element, as is known for example in coffee making machines where such an element is commonly used to keep the coffee hot after it has been made and commonly comprises a sheathed heating element as aforesaid cast or clenched into an aluminium casting which may itself form the base of the vessel or alternatively may be adapted to be secured to the commonly stainless steel base of the vessel. Alternatively, the planar heating element may be of a kind having patterned resistance heating elements formed on an electrically insulating substrate by use of lithographic techniques using conductive ink or by photolithographic techniques as are well known in the field of semiconductor device fabrication, and/or by other deposition techniques such as flame spraying of metals, plasma vapour deposition, etc. which per se are well known. The present invention is not limited to any particular form of planar heating element.

The thermally-responsive control may be a modified form of the aforementioned X1 control which is described in GB-A-2194099 with particular reference to FIGS. 3A, 3B and 3C thereof. The X1 control provides a primary level of element protection by virtue of incorporating a bimetallic actuator arranged to be located in use in close thermal contact with a heating element, and furthermore provides a secondary or back-up level of protection, effective in the event however unlikely of failure of the primary protection, by virtue of the bimetallic actuator being mounted in a synthetic plastics carrier which is arranged to deform in the event of the temperature of the element head portion continuing to rise above the temperature at which the primary level of protection would normally operate, the deformation of the carrier thus caused being arranged to effect a switching off of the heating element. Modification of the X1 control as described in GB-A-2194099 would normally be necessary on account of the fact that planar heating elements would not necessarily include the so-called "cold tails" which make electrical connection with the resistance heating element within a conventional sheathed heating element, though obviously if such cold tails or their equivalent were provided then the need for modification of the X1 control might, depending upon other circumstances, be obviated. Modification of the X1 control in this regard so as to enable it to be connected in circuit with the planar heating element is generally within the range of the routine skills of the notional man skilled in the art, but a preferred modification which forms the subject of our British Patent Application No. 9401559.1 will be described hereinafter. With the planar heating element forming the base of a water boiling vessel, for example, the modified X1 control (or any other suitable control) might be arranged below and in thermal contact with a portion of the heating element and the enclosure arranged directly above the bimetal blade of the X1 control, the enclosure having openings to allow the entry of water and the exit of steam as in WO 93/18631 and WO 93/18632.

Described hereinafter is an exemplary planar electrical heating element which can advantageously be utilized in the practice of the present invention and which is designed for use with an element protector control, such as the X1 control or a modified form thereof, having a primary thermally-responsive actuator and a secondary thermally-responsive actuator operable in response to the element temperature rising significantly above the temperature at which the primary actuator is designed to operate. The planar electrical heating element in question comprises a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor, said further electrically-insulating layer having an opening therethrough whereat, in use of the electrical heating element with the element protector control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of heat through the further electrically-insulating layer.

Also described hereinafter is an exemplary modified form of the aforementioned X1 element protector control which is particularly well suited to use with the abovementioned planar heating element. The bimetallic primary thermally-responsive actuator of the control is arranged to be responsive directly to the temperature of the heating element by virtue of being located so as to register with the opening in the further insulating layer, and the feet of a plastics material carrier which constitutes the secondary thermally-responsive actuator of the control and serves as a mounting for the bimetallic primary thermally-responsive actuator are arranged to contact the further insulating layer outside of the said opening therein. As described in detail hereinafter, the planar heating element has a stainless steel substrate or base plate, the two electrically-insulating layers are formed of a glass material and the electrical resistance heating element proper comprises a heater track formed of a conductive ink. The heater track has end terminations which are accessible through respective openings formed in the second electrically-insulating (eg., glass) layer and the element protector control has spring metal conductors adapted to make contact with the said end terminations when the control is put into operative positional relationship with the heating element. The use of a stainless steel substrate or base plate is advantageous for heating elements which are to be used in plastics bodied vessels since the relatively poor thermal conductivity of stainless steel can be employed to thermally isolate the plastics vessel body from the resistance heating element proper. However the use of a stainless steel substrate is exemplary only and other materials could be used. The substrate or base layer could even be one and the same as the first-mentioned electrically-insulating layer, in which case the electrical resistance heating element proper might be formed directly on the substrate.

More generally, an element protector control for use with a generally planar heating element advantageously comprises a body part formed of electrically insulating material, a primary thermally-responsive switch actuator provided on one side of said body part to be juxtaposed with a generally planar heating element, a secondary thermally-responsive switch actuator provided on said one side of said body part to be juxtaposed with said generally planar heating element at one or more locations spaced apart from the location whereat said primary thermally-responsive switch actuator is arranged to be juxtaposed with the generally planar heating element, switch means in said body part responsive to said primary and secondary thermally-responsive switch actuator for determining the supply of electrical energy through the control to the generally planar heating element, and terminal means electrically connected to said switch means and extending on said one side of said body part for electrically contacting electrical terminals of said generally planar heating element.

The foregoing and other aspects and features of the present invention are set forth with particularity in the appended claims and, together with the advantages thereof, will best be understood from consideration of the following detailed description, given with reference to the accompanying drawings, of an exemplary embodiment of the invention.

DESCRIPTION OF THE DRAWING

FIG. 1 schematically illustrates an exemplary water boiling jug embodying the present invention;

FIGS. 3A and 3B are schematic sectional side elevation and top plan views of an exemplary planar heating element which is well adapted for use with the control of FIG. 2.

DETAILED DESCRIPTION OF THE EMBODIMENT

Figure 2:
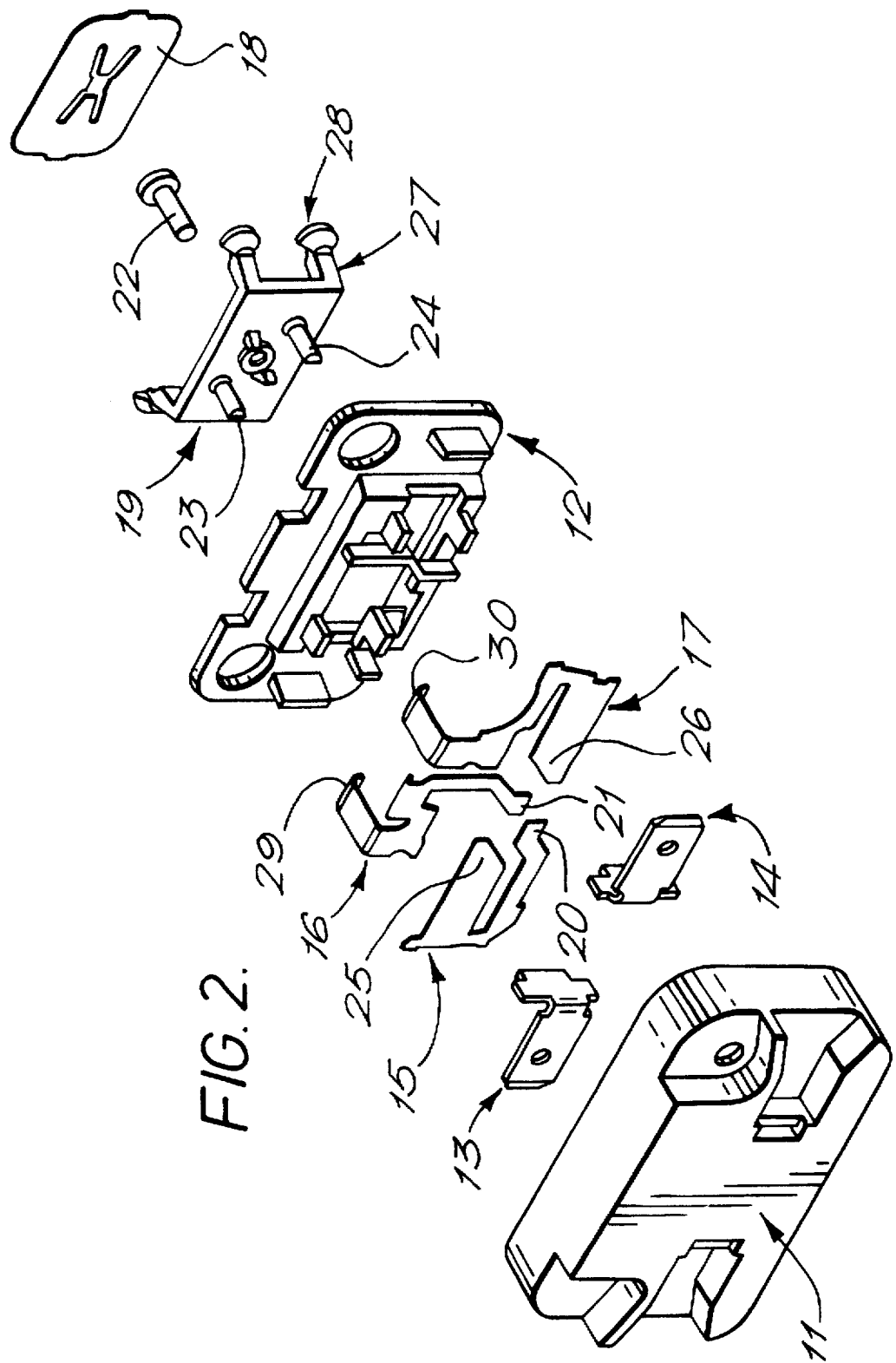
FIG. 2 shows an exploded perspective view of an exemplary element protector control which could be utilized as the control 3 in the jug of FIG. 1.

Referring first to FIG. 1 of the accompanying drawings, an electrically powered water boiling jug 1, formed for example of a moulded plastics material, is shown as having a base formed as a planar electrical heating element 2, and with a thermally-responsive control 3 at a specific location on the underside of the heating element 2 and an enclosure 4 located opposite the control 3 on the opposite side of the heating element, the enclosure 4 having openings 5 formed therein.

As aforementioned, the heating element 2 and the control 3 can take different forms, the essential requirement in this regard being that the thermally-responsive actuator of the control 3 must be in sufficiently close thermal contact with the heating element as to be responsive to the temperature thereof. The control 3 may for example comprise a modified form of the aforementioned X1 control and may have its bimetallic actuator in contact with the underside of the heating element 2. The heating element 2 may comprise a thin sheet of stainless steel, which forms the upper surface of the element, on the underside of which there is provided a thin layer of glass or other temperature-resistant electrically-insulating material. A resistance heating element proper is formed on the surface of the glass layer, for example by printing using an electrically conducting ink, and a further thin layer of glass or other temperature-resistant electrically-insulating material is provided over the printed element.

The holes 5 in the enclosure 4 permit water to enter the enclosure as the jug is filled and, as aforementioned, serve for the expulsion of water from the enclosure by steam generated when water boils in the vessel 1. Local boiling within the enclosure 4 as the main body of water is brought up to temperature, caused by the lack of significant convection currents within the enclosure, gives rise only to a steam bleed from the enclosure and the flow of replacement water into the enclosure from the relatively cooler main body of water. However, when the main body of water begins to boil, so the influx of relatively cool water to the enclosure ceases and the steam generated in the enclosure cause it rapidly to boil dry with a consequent rapid rise in the local temperature of the heating element. This rapid temperature rise is sensed by the control 3 which acts to switch off the supply of power to the element 2.

The enclosure 4 may be formed as in the arrangement described in WO 93/18631 as a sheet metal fabrication which may be spot welded or riveted or otherwise attached in the requisite position above the control 3. If the heating element 2 is formed on a metal plate, or attached to a metal plate, and the plate forms the bottom of the vessel, as in the arrangement described, then the control could alternatively be located towards the side of the plate, close to the edge; the enclosure could then be formed as an integral part of the vessel moulding which might be arranged to overlap the plate and cover the area thereof opposite to the bimetallic element of the control, and the vents in the enclosure could be defined by steps in the bottom edge of the enclosure and one or more holes in its top surface.

Alternatively, the present invention could be employed in a water boiling vessel of the so-called cordless type, for example with a rotationally free cordless connector system of the kind described in our International Patent Application No. PCT/GB 93/01814 (WO 94/06185). In such an application, the control might be placed centrally under the heating element, or at least centrally with respect to the vessel, and the enclosure could be a plastics moulding supported from the sides of the vessel and located at the centre of the heating element. Such a moulded plastics enclosure could be moulded integrally with the vessel, or alternatively could be separately formed but attached to and supported from the vessel walls. Given the close proximity of the enclosure to the heating element, it might be preferable if a moulded plastics enclosure is to be employed to form the enclosure of a material having superior heat resistant properties; a suitable material might for example be polyphenylene sulphide, e.g. Ryton™ from Phillips Petroleum, which is flame retardant and has a melting point in excess of 300° C.

Referring now to FIG. 2, the element protector control shown therein is a modified form of the X1 control aforementioned which is described in GB-A2194099 with particular reference to FIGS. 3A, 3B and 3C thereof. Reference should be had to GB-A2194099 for a full understanding of all aspects and advantages of the subject control which will be described only briefly in the following.

Referring to FIG. 2, the element protector control illustrated therein comprises first and second moulded plastics body parts 11 and 12 which are adapted to fit together and to capture therebetween first and second terminals 13 and 14 and spring metal conductors 15, 16 and 17. On the other side of body part 12 there is provided a bimetallic primary switch actuator 18 which, in similar manner to the X1 control described in GB-A-2194099, is adapted to be mounted in a plastics material carrier 19 which is adapted in turn to locate in predetermined manner with the front (not visible) face of body part 12.

The bimetallic primary switch actuator 18 is arranged, in a manner substantially identical to that described in GB-A-2194099, to determine the status of a switch defined by the parts 20 and 21 of the spring metal conductors 15 and 16, a push-rod 22 being provided for this purpose. The parts 20 and 21 normally make electrical contact with each other and are opened by push-rod 22 when the bimetallic primary switch-actuator 18 responds, in use, to an element overtemperature condition. In the event that the primary switch actuator fails, for whatever reason, to open the contact between the parts 20 and 21, the heating element will continue to be powered so that its temperature will rise to a level whereat the secondary thermally-responsive actuator constituted by the plastics material carrier 19 will become operative. The carrier 19 has rearwardly-facing projections 23 and 24 which are designed to extend through the body part 12 and into contact with the parts 25 and 26 of the spring metal conductors 15 and 17 so that, when the control is operatively coupled to a planar heating element and the carrier 19 is urged rearwardly towards the body part 12, the spring metal parts 25 and 26 are urged by the projections 23 and 24 into contact with the terminals 13 and 14 respectively. The carrier 19 has four legs 27 with feet 28 which sit upon the rear surface of an associated heating element and, when the element temperature rises to such a level as to cause the legs 27 to begin to melt, the carrier 19 is collapsed in a forwards direction towards the heating element by the spring action of the conductor parts 25 and 26 so that the conductor parts 25 and 26 eventually move out of contact with the terminals 13 and 14 of the control.

The element protector control of FIG. 2 is adapted for use with a generally planar heating element and it will be seen that the spring metal conductors 16 and 17 have forwardly extending portions 29 and 30 which are adapted to project forwardly of the control body part 12 and make electrical contact with terminal portions of the planar heating element for supplying electrical energy thereto through the control.

Referring now to FIGS. 3A and 3B, these show sectional side elevation and schematic plan views respectively of an exemplary form of planar heating element which can advantageously be utilized in the practice of the present invention. The planar heating element comprises a stainless steel substrate or base plate 31 having an electrically-insulating first layer 32 of glass formed thereon in a central area thereof, a heater track 33 formed of electrically conductive ink formed on the glass layer 32, and an electrically-insulating second glass layer 34 formed over the heater track 33 and over the first glass layer 31. An opening or window 35 is provided in the second glass layer 34 so as to expose the heater track 33 beneath the opening and, as shown in FIG. 3B, the opening 35 is sized to enable the bimetallic primary actuator 18 of the control of FIG. 2 to be directly responsive to the temperature of the heater track 33, but to locate the feet 28 of the carrier 19 on the glass surface outside of and surrounding the opening. Additional openings 36 and 37 are provided in the second glass layer 34 at locations corresponding to terminal ends 38 and 39 of the heater track 33 and are arranged to be contacted by the forwardly projecting parts 29 and 30 of the control spring conductors 16 and 17 when the control is fitted in operative relationship with the heating element. The terminal ends 38 and 39 of the heater track 33 are preferably formed of silver or of a likewise good electrical contact material.

Mounting pillars 40 and 41 are provided on the heating element base plate 31 for enabling the attachment of the element protector control thereto. Such mounting pillars may be screw threaded or may be designed to be engaged by any suitable form of friction securing means.

In operation of the thus-described planar heating element with the thus-described element protector control, the fact that the bimetallic primary actuator of the control is in direct heat transfer relationship with the heater track of the element ensures a rapid response of the control to an element overtemperature situation. At the same time, by insulating the secondary protection means, namely the collapsible carrier 19, from the heater track 33, it is ensured that the thermal overshoot which normally accompanies the primary operation of the control, that is to say the dynamic temperature rise that normally occurs in the element after operation of the primary protection, will not result in actuation of the secondary protection. The close thermal contact of the bimetallic primary actuator with the heater track furthermore enables improved primary protection response times to be achieved which additionally reduces the temperature overshoot level. These factors facilitate the selection of appropriate materials for the carrier 19.

The relatively "flat" shape of the element protector control of FIG. 2 is furthermore aesthetically advantageous and simplifies the task of incorporating the control into an aesthetically pleasing appliance design.

There has thus been described in the foregoing an arrangement of a bimetal control with a deforming backup protection, mounted to a planar heating element, in which the bimetal of the control makes direct thermal contact with the heater track and the deformable backup protection is thermally insulated from the track by an outer layer of glass which limits the overshoot temperature to which it is exposed, so that practical thermoplastics may be used in its construction. In addition, in this arrangement, a construction is described in which electrical connection to the heater track is made by direct contact between springs, which are integral with the control, and printed contact points electrically connected to the heater track. By providing an enclosure, as shown in FIG. 1, located on the wet side of the heating element at a location corresponding to the location on the dry side of the element whereat the control makes thermal contact with the element, single sensor control of the element for both automatic switch-off on boiling and over-temperature protection can be achieved.

The invention having thus been described with reference to exemplary embodiments, it is to be clearly understood that the described embodiments illustrate and exemplify the invention and do not limit the same, and that modifications and variations will occur to those possessed of relevant skills without departure from the scope of the invention as indicated by the appended claims. For example, whereas in the arrangement of FIG. 1 the enclosure is provided within the body of the vessel 1, the enclosure could be provided outside of the vessel body, but communicating therewith via an apertured wall, and the planar element could likewise have a part extending out of the vessel body and underlying the enclosure, such part co-operating with the control 3. Such an alternative arrangement provides additional possibilities as regards aesthetic design of the vessel body.

I claim:

1. An electrically-heated water boiling vessel wherein a planar heating element is coupled to or constitutes a wall of the vessel, a thermally responsive control for said heating element is arranged in the thermal contact with said heating element at a specific location thereof, and an enclosed is provided at a location corresponding to the location of the thermal contact of the control with the heating element but on the other side of the heating element, the arrangement of the enclosure being such that in use of the vessel is filled and the onset of boiling and the consequent generation of steam in the enclosure will cause the water substantially to be expelled therefrom so as to mimic a dry boil situation sensible by the thermally-responsive control.

2. An electrically-heated water boiling vessel as claimed in claim 1 wherein the planar heating element comprises an elongate, metal-sheathed, electrically-insulated, resistance heating element affixed to a planar element.

3. An electrically-heated water boiling vessel as claimed in claim 1 wherein the planar heating element comprises a patterned resistance heating element formed on an electrically-insulating substrate.

4. An electrically-heated water boiling vessel as claimed in claim 1 wherein the planar heating element comprises a thin sheet of stainless steel, which forms the upper surface of the element, on the underside of which there is provided a thin layer of glass or other temperature-resistant, electrically-insulating material, a resistance heating element proper formed on said layer of electrically-insulating material, and a further thin layer of glass or other temperature-resistant, electrically-insulating material formed over the resistance heating element proper.

5. An electrically-heated water boiling vessel according to claim 1 wherein said thermally-responsive control comprises a primary control and a secondary control, the secondary control being operative in the event of failure of the primary control.

6. An electrically-heated water boiling vessel as claimed in claim 1 wherein said planar heating element is designed for use with a thermally-responsive control having a primary thermally-responsive actuator and a secondary thermally-responsive actuator operable in response to the element temperature rising significantly above the temperature at which the primary actuator is designed to operate, said planar heating element comprising a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor, said further electrically-insulating layer having an opening therethrough whereat, in use of the electrical heating element with the thermally-responsive control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of heat through the further electrically-insulating layer.

7. An electrically-heated water boiling vessel as claimed in claim 6 wherein said substrate or base plate is formed of a metallic material.

8. An electrically-heated water boiling vessel as claimed in claim 7 wherein said metallic material comprises stainless steel.

9. An electrically-heated water boiling vessel as claimed in claim 6 wherein said substrate or base plate is formed of a non-metallic electrically-insulating material.

10. An electrically-heated water boiling vessel as claimed in claim 1 wherein said planar heating element is designed for use with a thermally-responsive control having a primary thermally-responsive actuator and a secondary thermally-responsive actuator operable in response to the element temperature rising significantly above the temperature at which the primary actuator is designed to operate, said planar heating element comprising a substrate or base plate, an electrically-insulating layer formed on a portion at least of one surface of said substrate or base plate and is formed of a glass material, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor, said further electrically-insulating layer having an opening therethrough whereat, in use of the electrical heating element with the thermally-responsive control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of beat through the further electrically-insulating layer.

11. An electrically-heated water boiling vessel as claimed in claim 1 wherein said planar heating element is designed for use with a thermally-responsive control having a primary thermally-responsive actuator and a secondary thermally-responsive actuator operable in response to the element temperature rising significantly above the temperature at which the primary actuator is designed to operate, said planar heating element comprising a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper and said electrical conductor comprising an electrically-resistive heater track deposited onto said electrically-insulating layer, and a further electrically-insulating layer formed over said electrical conductor, said further electrically-insulating layer having an opening therethrough whereat, in use of the electrical heating element with the thermally-responsive control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by condition of heat through the further electrically-insulating layer.

12. An electrically-heated water boiling vessel as claimed in claim 11 wherein said heater track includes end terminations underlying respective apertures provided in said further electrically-insulating layer for enabling said end terminations to be accessed for supplying electrical energy to the heater track.

13. An electrically-heated water boiling vessel as claimed in claim 1 wherein said planar heating element is designed for use with a thermally-responsive control having a primary thermally-responsive actuator and a secondary thermally-responsive actuator operable in response to the element temperature rising significantly above the temperature at which the primary actuator is designed to operate, said planar heating element comprising a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor, said further electrically-insulating layer having an opening therethrough whereat, in use of the electrical heating element with the thermally-responsive control aforesaid, the primary thermally-responsive actuator comprises a bimetallic element and may access the said electrical conductor so as to be responsive directly to the temperature thereof, and the secondary thermally-responsive actuator comprises a member formed of a material selected to be deformable under spring pressure at temperatures above a predetermined level, said secondary thermally-responsive actuator being prevented from accessing the said electrical conductor directly and being responsive to the temperature thereof by conduction of heat through the further electrically-insulating layer.

14. An electrically-heated water boiling vessel as claimed in claim 13 wherein the secondary thermally-responsive actuator comprises a member formed of a thermoplastics material.

15. An electrically-heated water boiling vessel as claimed in claim 13 wherein the secondary thermally-responsive actuator comprises a carrier for said bimetallic element.

16. An electrically-heated water boiling vessel as claimed in claim 13 wherein said element protector control comprises a body part formed of electrically-insulating material, said primary thermally-responsive switch actuator is provided on one side of said body part to be juxtaposed with said opening of the heating element, said secondary thermally-responsive actuator is provided on said one side of said body part to be juxtaposed with said heating element at one or more locations spaced from said opening, switch means are provided in said body part responsive to said primary and secondary thermally-responsive actuators for determining the supply of electrical energy through the control to the heating element, and terminal means are provided electrically connected to said switch means and extending on said one side of said body part for electrically contacting electrical terminals of said heating element.

17. An electrically-heated water boiling vessel as claimed in claim 6 wherein said planar heating element is designed for use with a thermally-responsive control having a primary thermally-responsive actuator and a secondary thermally-responsive actuator operable in response to the element temperature rising significantly above the temperature at which the primary actuator is designed to operate, said planar heating element comprising a substrate or base plate, an electrically-insulating layer formed on a portion at least of one surface of said substrate or base plate, an electrical conductor formed on said electrically-insulating layer so as to be isolated thereby from said substrate or base plate, said electrical conductor being formed of a material having such an electrical resistance as to constitute an electrical resistance heating element proper, and a further electrically-insulating layer formed over said electrical conductor and formed of a glass material, said further electrically-insulating layer having an opening therethrough whereat, in use of the electrical heating element with the thermally-responsive control aforesaid, the primary thermally-responsive actuator may access the said electrical conductor so as to be responsive directly to the temperature thereof, the secondary thermally-responsive actuator being prevented from accessing the said electrical conductor directly and being responsive to the temperature thereof by conduction of heat through the further electrically-insulating layer.

* * * * *